US009986199B2

(12) United States Patent
Zdepski

(10) Patent No.: US 9,986,199 B2
(45) Date of Patent: *May 29, 2018

(54) SYSTEMS AND METHODS TO POSITION AND PLAY CONTENT

(71) Applicant: OpenTV, Inc., San Francisco, CA (US)

(72) Inventor: Joel Zdepski, Mountain View, CA (US)

(73) Assignee: OPENTV, INC., San Francisco, CA (US)

(*) Notice: Subject to any disclaimer, the term of this patent is extended or adjusted under 35 U.S.C. 154(b) by 308 days.

This patent is subject to a terminal disclaimer.

(21) Appl. No.: 14/696,307

(22) Filed: Apr. 24, 2015

(65) Prior Publication Data

US 2015/0229875 A1 Aug. 13, 2015

Related U.S. Application Data

(63) Continuation of application No. 13/670,658, filed on Nov. 7, 2012, now Pat. No. 9,042,711, which is a (Continued)

(51) Int. Cl.

*G11B 27/34* (2006.01)
*G11B 27/00* (2006.01)
(Continued)

(52) U.S. Cl.

CPC ............... *H04N 5/783* (2013.01); *H04N 9/87* (2013.01); *H04N 21/44016* (2013.01); (Continued)

(58) Field of Classification Search

CPC .. H04N 1/00; H04N 2005/00; H04N 2101/00; H04N 2213/00; G11B 27/34; G11B 27/034; G11B 27/105; G11B 27/10
(Continued)

(56) References Cited

U.S. PATENT DOCUMENTS 6,721,490 B1 * 4/2004 Yao .................. H04N 21/23106 348/E5.008
6,907,570 B2 6/2005 Amir et al.
(Continued)

OTHER PUBLICATIONS

"U.S. Appl. No. 11/680,360 , Response filed Sep. 9, 2011 to Final Office Action dated Jul. 11, 2011", 17 pgs.
(Continued)

*Primary Examiner* — Daquan Zhao

(74) *Attorney, Agent, or Firm* — Schwegman Lundberg & Woessner, P.A.

(57) ABSTRACT

Systems and methods to position and play content. The system renders a first content segment to an output device at an accelerated speed for the first content segment. Next, the system receives a request to play the first content segment from the beginning of the first content segment at a normal speed for the first content segment. Next, the system automatically positions to the beginning of the first content segment based on position information that is associated with the first content segment. Finally, the system renders the first content segment to the output device from the beginning of the first content segment at a normal speed for the first content segment.

21 Claims, 9 Drawing Sheets

BUFFER 106
CONTENT 32
CONTENT SEGMENT 92 (E.G., GILIGAN'S ISLAND)
CONTENT SEGMENT 92 (E.G., COMMERCIAL)
CONTENT SEGMENT 92 (E.G., GILIGAN'S ISLAND)
AUDIO DATA 94
VIDEO DATA 96
METADATA 98
POSITION INFORMATION 100
87
OPERATIONS 110
END
BEGINNING
114
FAST FORWARD
PLAY
116
112
118
JUMP
FAST FORWARD
122
PLAY
120

Related U.S. Application Data continuation of application No. 11/680,360, filed on Feb. 28, 2007, now Pat. No. 8,331,772.

(60) Provisional application No. 60/824,797, filed on Sep. 7, 2006.

(51) Int. Cl.

| | |
|---|---|
| ***G11B 27/034*** | (2006.01) |
| ***H04N 5/783*** | (2006.01) |
| ***H04N 21/44*** | (2011.01) |
| ***H04N 21/472*** | (2011.01) |
| ***H04N 21/488*** | (2011.01) |
| ***H04N 21/81*** | (2011.01) |
| ***H04N 21/845*** | (2011.01) |
| ***H04N 9/87*** | (2006.01) |
| *H04N 1/00* | (2006.01) |

(52) U.S. Cl.
CPC ... *H04N 21/47217* (2013.01); *H04N 21/4882* (2013.01); *H04N 21/812* (2013.01); *H04N 21/8455* (2013.01); *H04N 21/8456* (2013.01)

(58) Field of Classification Search
USPC ....... 386/205, 206, 221, 222, 228, 343, 345, 386/346, 347, 348, 349
See application file for complete search history.

(56) References Cited

U.S. PATENT DOCUMENTS

| | | | | | |
|---|---|---|---|---|---|
| 7,209,631 | B2 | 4/2007 | Tada et al. | | |
| 7,716,700 | B2 | 5/2010 | Carlucci et al. | | |
| 8,331,772 | B1 | 12/2012 | Zdepski | | |
| 9,042,711 | B2 | 5/2015 | Zdepski | | |
| 2003/0115600 | A1 | 6/2003 | Tanaka | | |
| 2004/0240841 | A1 | 12/2004 | Takagi et al. | | |
| 2006/0098941 | A1* | 5/2006 | Abe | G11B 27/031 | 386/279 |
| 2006/0257099 | A1* | 11/2006 | Potrebic | H04N 5/76 | 386/344 |
| 2007/0036522 | A1* | 2/2007 | Yoshida | G11B 27/105 | 386/241 |
| 2013/0121669 | A1 | 5/2013 | Zdepski | | |

OTHER PUBLICATIONS

"U.S. Appl. No. 11/680,360 , Response filed Aug. 27, 2012 to Non Final Office Action dated Apr. 26, 2012", 12 pgs.
"U.S. Appl. No. 11/680,360, Examiner Interview Summary dated Aug. 26, 2011", 3 pgs.
"U.S. Appl. No. 11/680,360, Examiner Interview Summary dated Aug. 27, 2012", 3 pgs.
"U.S. Appl. No. 11/680,360, Final Office Action dated Jul. 11, 2011", 20 pgs.
"U.S. Appl. No. 11/680,360, Non Final Office Action dated Feb. 14, 2011", 24 pgs.
"U.S. Appl. No. 11/680,360, Non Final Office Action dated Apr. 26, 2012", 14 pgs.
"U.S. Appl. No. 11/680,360, Notice of Allowance dated Sep. 18, 2012", 5 pgs.
"U.S. Appl. No. 11/680,360, Response filed May 9, 2011 to Non Final Office Action dated Feb. 14, 2011", 18 pgs.
"U.S. Appl. No. 13/670,658, Examiner Interview Summary dated Aug. 27, 2014", 4 pgs.
"U.S. Appl. No. 13/670,658, Final Office Action dated Aug. 13, 2014", 15 pgs.
"U.S. Appl. No. 13/670,658, Non Final Office Action dated Apr. 25, 2014", 14 pgs.
"U.S. Appl. No. 13/670,658, Notice of Allowance dated Jan. 21, 2015", 5 pgs.
"U.S. Appl. No. 13/670,658, Response filed Jul. 24, 2014 to Non Final Office Action dated Apr. 25, 2014", 15 pgs.
"U.S. Appl. No. 13/670,658, Response filed Nov. 13, 2014 to Final Office Action dated Aug. 13, 2014", 17 pgs.
U.S. Appl. No. 11/680,360, filed Feb. 28, 2007, Systems and Methods to Position and Play Content.
U.S. Appl. No. 13/670,658, filed Nov. 7, 2012, Systems and Methods to Position and Play Content.

* cited by examiner

SYSTEMS AND METHODS TO POSITION AND PLAY CONTENT

RELATED APPLICATIONS

This application is a continuation of U.S. application Ser. No. 13/670,658, filed Nov. 7, 2012, which is a continuation of, and which claims the priority benefit of, U.S. application Ser. No. 11/680,360, filed Feb. 28, 2007, now U.S. Pat. No. 8,331,772, issued on Dec. 11, 2012, which claims the priority benefit of U.S. Provisional Application No. 60/824,797, filed Sep. 7, 2006, each of which is incorporated by reference herein in its entirety.

FIELD

Embodiments relate generally to the technical field of communications and more specifically to systems and methods to position and play content.

BACKGROUND

Receiving devices such as personal video recorders (PVRs) or digital video recorders (DVRs) provide support for trick mode requests that enable a user to fast forward or rewind content. For example, a user who has recorded a television program and advertisements on a PVR may fast forward through the content. Advertisers are wary of the fast forwarding because their advertisements are being skipped. The communications industry has responded by providing so-called "speed bump" technology. A "speed bump" is a warning to slow down. In the present context, a "speed bump" may warn a user that an advertisement that is fast forwarding or rewinding on a display device may be of interest to the user. For example, a speed bump may be a Mercedes Benz trademark that is superimposed over an advertisement for a Mercedes Benz Automobile that is fast forwarding. Accordingly, a user that is shopping for a Mercedes Benz may be alerted by the speed bump that the fast forwarding advertisement includes subject matter that is of interest to the user, a Mercedes Benz. Notwithstanding the user's interest, in some instances, the user may be unable or unwilling to enter the set of commands that are necessary to play the advertisement from the beginning at a normal speed.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
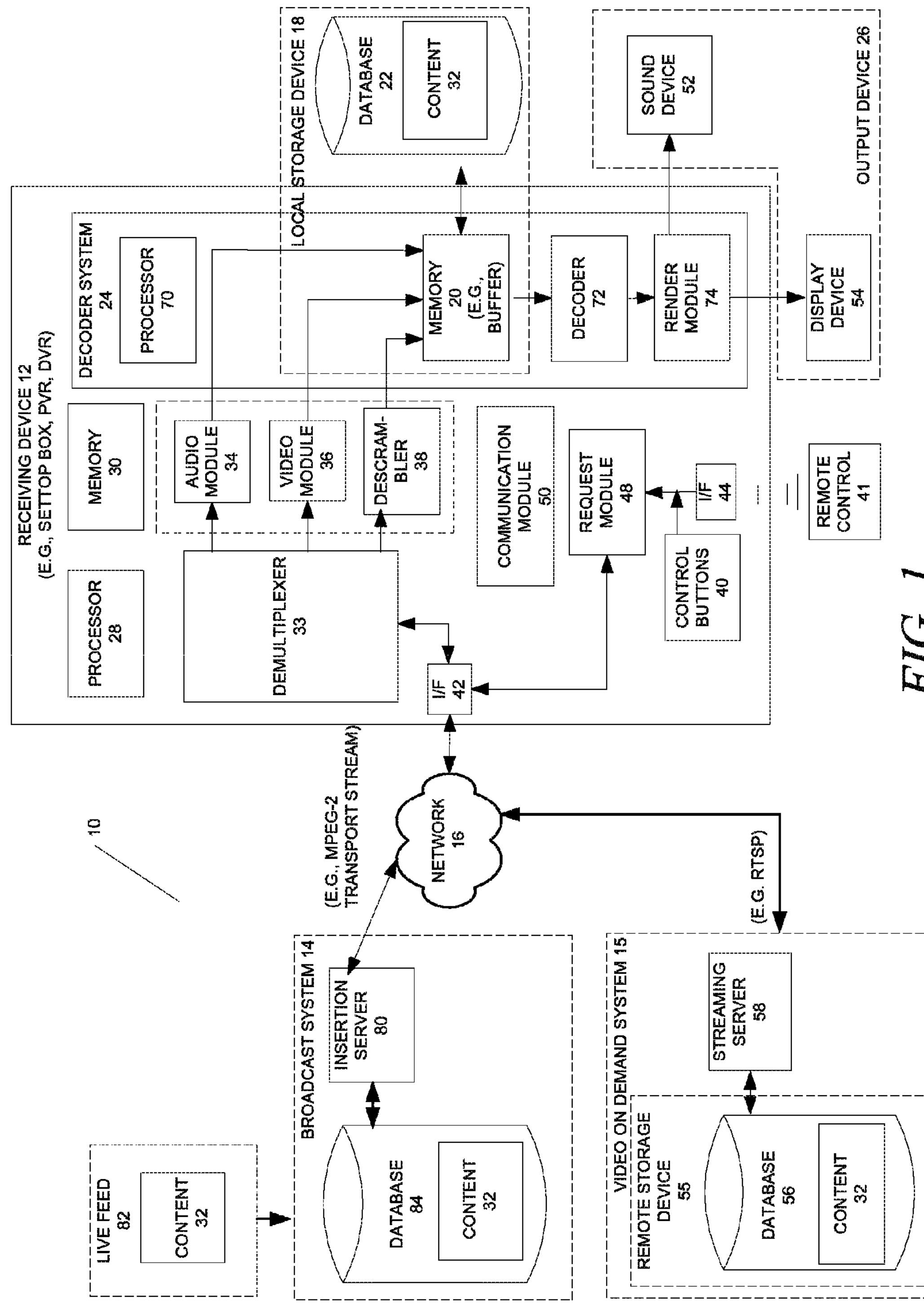
FIG. 1 is a block diagram illustrating a system, according to an example embodiment, to position and play content.

In the following description, for purposes of explanation, numerous specific details are set forth in order to provide a thorough understanding of example embodiments of the present invention. It will be evident, however, to one skilled in the art that the present invention may be practiced without these specific details.

Example embodiments describe processing a request to position and play a content segment. For example, a user that is fast forwarding through an advertisement may want to view the advertisement from the beginning at a normal speed. Accordingly, the user may select a button on a remote control (e.g., Play button, Position and Play button, etc.) to initiate automatic positioning to the beginning of the advertisement and playing of the advertisement at a normal speed. For example, in response, to a request to position and play an advertisement that may be fast forwarding, the advertisement may be associated to metadata that may include position information used to identify the beginning of the advertisement. Next, the advertisement may be positioned to the beginning of the advertisement based on the metadata and played to the user at a normal speed for the advertisement. For example, a jump operation may be performed to jump immediately to the beginning of the advertisement. In some embodiments, fast forwarding is resumed responsive to the end of the advertisement. In other embodiments, a play mode or normal speed is maintained responsive to the end of the advertisement. Also, for example, if the advertisement is rewinding, a request to position and play the advertisement may cause a jump to the beginning of the advertisement and play of the advertisement to the user at a normal speed for the advertisement. Other embodiments may include, playing an extended version of the advertisement. Yet other embodiments may include retrieving a version of the advertisement from a remote or local storage device.

Terminology

Content in this document is intended to include media that may be played on a receiving device or interacted with on a receiving device. Content may include but is not limited to entertainment content and advertisement content. Further, content may include video content and/or audio content and/or multimedia content and associated metadata. Further, content may include prerecorded content or live content.

Normal Speed in this document is intended to include an instantaneous speed to render a discrete unit of content (e.g., content segment) to an output device, the normal speed being the speed necessary to completely render the content segment from beginning to end in a predetermined play time that is associated with the content segment. For example, an episode of Gilligan's Island may be rendered at a receiving device at a normal speed such that the episode completes in a predetermined running time (e.g., play time) of twenty-five minutes. Play times may be published with the content segment. For example, movies may be stored on media and labeled with the play time of the movie. A normal speed may be applicable to advancing the discrete unit of content in forward or reverse directions.

Accelerated Speed in this document is intended to include an instantaneous speed to render a discrete unit of content to an output device, the accelerated speed being any speed greater than the normal speed associated with the discrete unit of content. An accelerated speed may be applicable to advancing the discrete unit of content in forward or reverse directions.

Point to Multi-Point Communications

The subject matter of the present disclosure may be embodied using point to multi-point communications. For example, point to multi-point communications may be embodied as a broadcast system that includes an insertion server that broadcasts a transmission that includes content to multiple receiving devices (e.g., settop boxes).

Point to Point Communications

The subject matter of present disclosure may also be embodied using point to point communications. For example, point to point communications may be embodied as a video on demand system that includes a streaming server that may communicate or stream content to a single receiving device (e.g. client computer).

FIG. 1 is a block diagram illustrating a system 10, according to an example embodiment. The system 10 is shown to include a receiving device 12, a broadcast system 14, a video on demand system 15, and a network 16. The receiving device 12 may, for example, include a set top box (STB), a personal computer, an iPod, a personal video recorder (PVR) (e.g., analog or digital input), a personal digital recorder (PDR) (e.g., analog or digital input), a mobile phone, a portable media player, a game console or any other device capable of playing video and/or audio content. The receiving device 12 may include a local storage device 18 that includes a memory 20 and/or a database 22 that may store content 32, a decoder system 24, and may be coupled to an output device 26. The receiving device 12 may further include a processor 28, a memory 30, a demultiplexer 33, an audio module 34, a video module 36, a descrambler 38, control buttons 40, an interface 42, an interface 44, a request module 48, and a communication module 50. The processor 28 may execute instructions, move data (e.g., content 32), process data, etc. The demultiplexer 33 may demultiplex the content 32 into audio, video, and meta-data streams that may be respectively communicated to the audio module 34, the video module 36 and the descrambler 38. The meta-data streams may further be communicated to the processors 28, 70 or the memory 30, 20. The metadata stream may include position information that may be used to identify the location and the beginning of a content segment and descrambling information that may include conditional access decryption keys that may be used by the descrambler 38 to descramble or decrypt the audio and video streams. Other embodiments may not include the descrambler 38. The audio module 34 may process the audio stream and store the audio stream in the form of packets or frames in the memory 20. Similarly, the video module 36 may process the video stream and store the video stream in the form of packets or frames in the memory 20. In an example embodiment, the receiving device 12 may be operated or controlled with control buttons 40 and/or a remote control 41. The output device 26 may include a sound device 52 and a display device 54, however, it will be appreciated by those skilled in the art that the output device 26 may also include a machine device to communicate machine interface information (e.g., SGML) to a machine (e.g., client, server, peer to peer).

The request module 48 may receive requests that may be entered with the control buttons 40 or remote control 41 and received via the interface 44. For example, the request module 48 may receive a request to play the content, a request to fast forward the content, a request to rewind the content, a request to pause content, a request to position to the beginning of a content segment and to play the content segment or other types of requests. The communication module 50 may respond to requests received by the request module 48. For example, the communication module 50 may respond by identifying the content segment that is presently advancing at an accelerated speed, using metadata included with the content segment to position to the beginning of the content segment, and causing the content segment to be played or rendered at a normal speed on the output device 26. In another example, the communication module 50 may retrieve a second content segment that is rendered instead of the original content segment. For example, the communication module 50 may retrieve the second content segment from a remote storage device 55. In one embodiment a remote storage device 55, as shown connected to a streaming server 58 at the video on demand system 15, may include a database 56 that may be used to store the second content segment (e.g., content 32).

The decoder system 24 is shown to include a processor 70, the memory 20, the decoder 72 and a render module 74. The processor 70 may be used for executing instructions and moving data. For example, the processor 70 may be used to move the content 32 or other data from the memory 20 to the decoder 72. The decoder 72 may decode the packets/frames into image and sound data. The render module 74 may render the sound data to the sound device 52 and render the image data to the display device 54.

The local storage device 18 may include a circular buffer that includes both the memory 20 and the database 22. The circular buffer may be utilized by the receiving device 12 to store the content 32. For example, a user may be watching a movie and select a pause button on the remote control 41 that causes the movie to be stored in the circular buffer. Next, the user may select the play button on the remote control 41 to cause the receiving device 12 to resume rendering the movie to the output device 26 by retrieving the movie from the circular buffer.

The interface 42 may enable the receiving device 12 to receive a transmission from the broadcast system 14 and/or a stream from the video on demand system 15.

The network 16 may be any network capable of communicating video and/or audio and may include the Internet, closed IP networks such as DSL or FTTH, digital broadcast satellite, cable, digital, terrestrial, analog and digital (satellite) radio, etc. and/or hybrid solutions combining one or more networking technologies.

The broadcast system 14 is shown to include an insertion server 80, a live feed 82, and a database 84. The insertion server 80 may communicate the content 32 in a transmission to the receiving device 12. The transmission may be formatted in a Moving Pictures Expert Group-2 (MPEG-2) transport format, a MPEG-4 transport format, an Internet Protocol (TCP/IP) transport format, QuickTime, or any other similar transport mechanisms/formats. Further, the transmission may include an MPEG-2 compressed video stream, a MPEG-4 compressed video stream, a VC1 compressed video stream, or any other similar compression formats. The insertion server 80 may receive the content 32 from the database 84 (e.g., prerecorded content 32) or the content 32 from the live feed 82 (e.g., live content 32).

Further, the video on demand system 15, as previously described, includes the streaming server 58. The streaming server 58 may communicate the content 32 to the receiving device 12. For example, the receiving device 12 may receive the content 32 in the form a stream that may be communicated as part of the real time streaming protocol (RTSP) or the digital storage media command and control protocol (DSM-CC) from the streaming server 58.

While the system 10 shown in FIG. 1 employs a client-server architecture, the present disclosure is of course not limited to such an architecture, and could equally well find application in a distributed, or peer-to-peer, architecture system. The request module 48 and communication module 50 may also be implemented as standalone software programs, which do not necessarily have networking capabilities.

Figure 2:
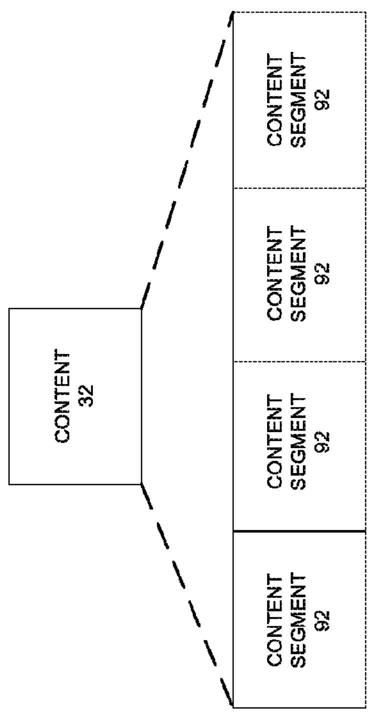
FIG. 2 is a block diagram illustrating content, according to an example embodiment.

FIG. 2 is a block diagram illustrating content 32, according to an example embodiment of the present disclosure. The content 32 is shown to include multiple content segments 92 that may be played in chronological sequence from right to left. The content segment 92 (e.g., prerecorded or live) may include a commercial, a public service announcement, an infomercial, an audio/video asset such as a movie, television program such as a documentary, a biography, a cartoon, a program, music, or music video or an audio asset such as music track, audio interview, news program or any other content. In some embodiments, the content segment 92 may include an interactive application that when executed at the receiving device 12 may result in a presentation to a user that enables the user to interact with the content segment 92. For example, a content segment 92 in the form of an episode of "American Idol" may include an interactive application that may cause a pop-up that enables an end user to cast a vote.

Figure 3:
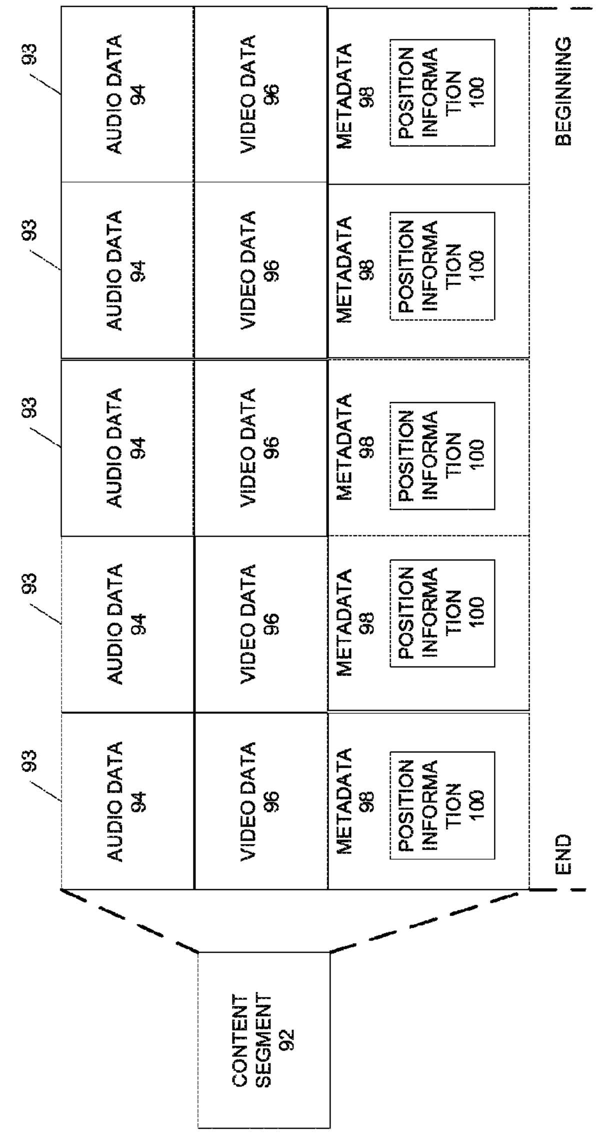
FIG. 3 is a block diagram illustrating a content segment, according to an example embodiment.

FIG. 3 is a block diagram illustrating an example embodiment of a content segment 92. The content segment 92 is shown to include audio data 94, video data 96 and metadata 98. The content segment 92 is further shown to be divided into parts 93 of audio data 94, video data 96, and metadata 98. The first part of the content segment 92 is shown on the right and the last part of the content segment 92 is shown on the left. Accordingly, the parts 93 of the content segment 92, as illustrated, may be played from right to left. The audio data 94 includes audio information that may be used to generate sound. The video data 96 includes video information that may be used to generate visual (e.g., motion, stills, animation, illustrations, etc.). The metadata 98 includes metadata information that may be used to process the audio data 94 and video data 96 (e.g., descramble), enhance the audio data 94 and video data 96 (e.g., enhance with an interactive quality to enable interaction with the user), and position and play the content segment 92. For example, the content segment 92 is shown to include position information 100 that may be used to position the content segment 92 to the beginning and play the content segment 92 from the beginning.

Figure 3A:
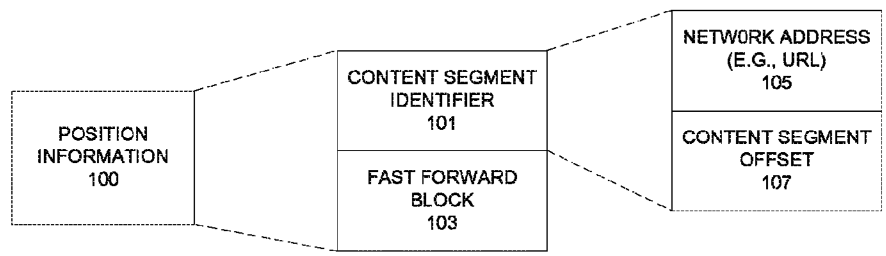
FIG. 3A is a block diagram illustrating position information, according to an example embodiment.

FIG. 3A is a block diagram illustrating position information 100, according to an example embodiment of the present disclosure. The position information 100 may include a content segment identifier 101 and/or a fast forward block 103. The content segment identifier 101 may include a network address 105 and a content segment offset 107. The network address 105 may identify a file or a buffer that may contain the content segment 92. The content segment offset 107 may identify the location of the content segment 92 in the file or the buffer 106. For example, the network address 105 may identify a buffer in the memory 20, 30 (e.g., buffer address), a local storage device (e.g., local storage device 18), or a remote storage device (e.g., remote storage device 55). In one embodiment, the network address 105 may be a universal resource locater (URL). Accordingly, the network address 105 and the content segment offset 107 may be used by the receiving device 12 to position to the beginning of the content segment 92 for render to the receiving device 12. In one embodiment, the position information 100 may include multiple content segment identifiers 101 that correspond to different versions of the content segment 92. For example, the multiple versions of the content segment 92 may include an extended version of a commercial and an abbreviated version of the commercial. For example, the user may be fast forwarding through a content segment 92 that includes a commercial and request to position and play a version of the commercial that is different from the version that is fast forwarding. Indeed, the user may select a dedicated control button or function key on the remote control 41 to view an extended version (e.g., sixty seconds) or an abbreviated version (e.g., ten seconds) of the commercial instead of the standard version of the commercial (e.g., twenty seconds) that may be fast forwarding on the receiving device 12. In one embodiment the content segment 92 (e.g., commercial) may include an interactive capability that enables the user to interact with the content segment 92 (e.g., commercial).

The fast forward block 103 may prevent the user from fast forwarding through the associated content segment 92. Accordingly, a position and play request may not be processed for a content segment 92 that may not be fast forwarded. Nevertheless, the fast forward block 103 does not preclude processing a position and play request during a rewind of the same content segment 92.

Figure 4:
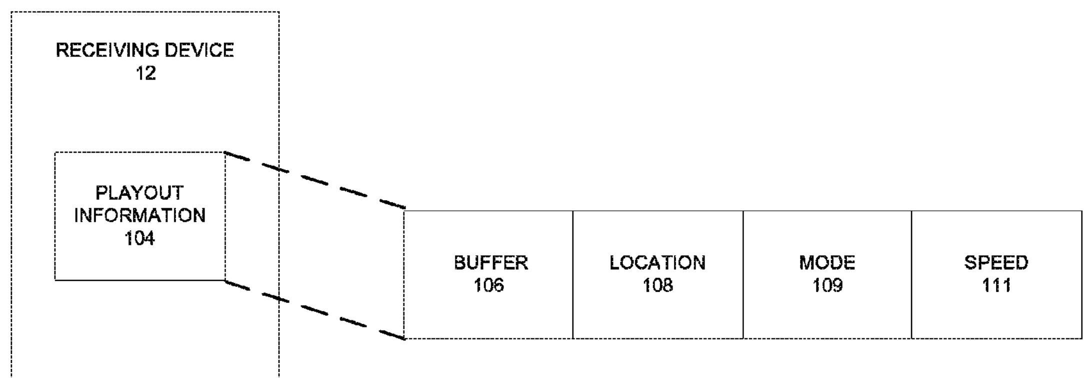
FIG. 4 is a block diagram illustrating playout information, according to an example embodiment.

FIG. 4 is a block diagram illustrating an example embodiment of playout information 104. The receiving device 12 may use the playout information 104 to process requests received by the receiving device 12. The playout information 104 includes a buffer 106, a location 108, a mode 109 and a speed 111. The buffer 106 may be used to store a content segment 92. The buffer 106 may include any combination or type of storage devices (e.g., memory, disk, compact disk, etc.) The location 108 is an address in the buffer 106 that is presently being processed. For example, the location 108 may identify the next video data 96 and audio data 94 in the content segment 92 to be rendered to the output device 26. Further, the location 108, for example, may rapidly increase (e.g., fast forward), rapidly decrease (e.g., rewind), slowly increase (e.g., play), etc. The mode may be used to store the present mode associated with the content segment 92 (e.g., play, fast forward, rewind, position and play, etc.). The speed 111 may be used to store the present speed of the content segment 92 (e.g., 1× normal, 2× normal, 3× normal, etc.) and may indicate a forward or reverse motion.

Figure 5:
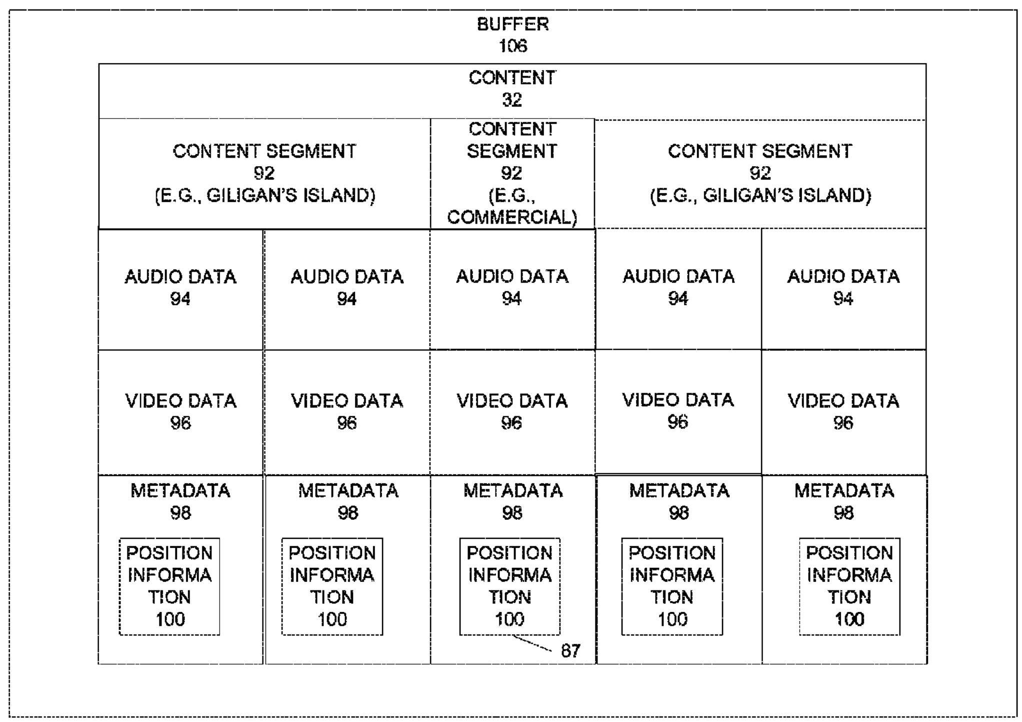
FIG. 5 is a block diagram illustrating a buffer and operations, according to an example embodiment.
Figure 5:
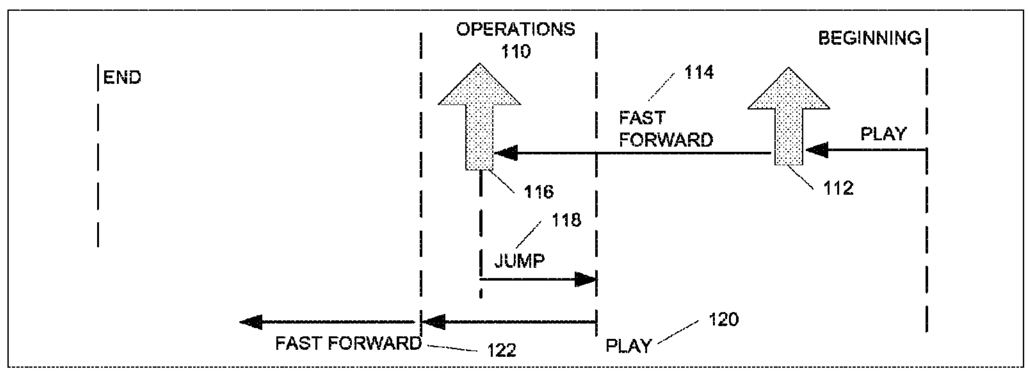

FIG. 5 is a block diagram illustrating example embodiments of operations 110 performed in response to a request to position and play. The operations 110 are illustrated below a buffer 106 that stores content segments 92 that may be rendered (e.g., play) to an output device 26 coupled to a receiving device 12. The operations 110 commence with a request 112, from a user, to fast forward the content segment 92. For example, the user may be watching an episode of Gilligan's Island and select a fast forward button on a remote control 41 that causes fast forwarding to begin, as illustrated by callout 114. The fast forward is illustrated as continuing into the next content segment 92 that includes a commercial.

Indeed, the receiving device 12 may respond by causing a speed bump to be displayed on the display device 54. For example, in one embodiment the speed bump may be still image that represents the content of the commercial (e.g., Mercedes Benz Logo). The user may see the speed bump and enter a request 116 to position and play the commercial from the beginning. In response to receiving the request 116, the receiving device 12 may use the corresponding position information 100 (e.g., callout 87) in the metadata 98 to jump to the beginning of the commercial in the buffer 106, as illustrated by the arrow 118. Other embodiments may respond to the request 116 by rewinding to the beginning of the commercial. At operation 120, the commercial is rendered to an output device 26 (e.g., play) at a normal speed from the beginning of the commercial until the end of the commercial. At operation 122, responsive to reaching the end of the commercial, the receiving device 12 may resume fast forwarding (e.g., accelerated speed) Gilligan's Island. Other embodiments may respond to reaching the end of the commercial by continuing at a normal speed in play mode.

It will be appreciated, that the audio data 94, video data 96, and metadata 98 may not necessarily be stored the same physical buffer 106. For example, in one embodiment the audio data 94, video data 96, and metadata 98 may be stored in respective buffers 106. Nevertheless, the processing, as described above, may remain substantially the same. Further it will be appreciated that the buffer 106 may not be a physical buffer, but rather, a logical buffer 106 that may be implemented in multiple physical storage devices (e.g., memory, disk, DVD, etc.)

Figure 6:
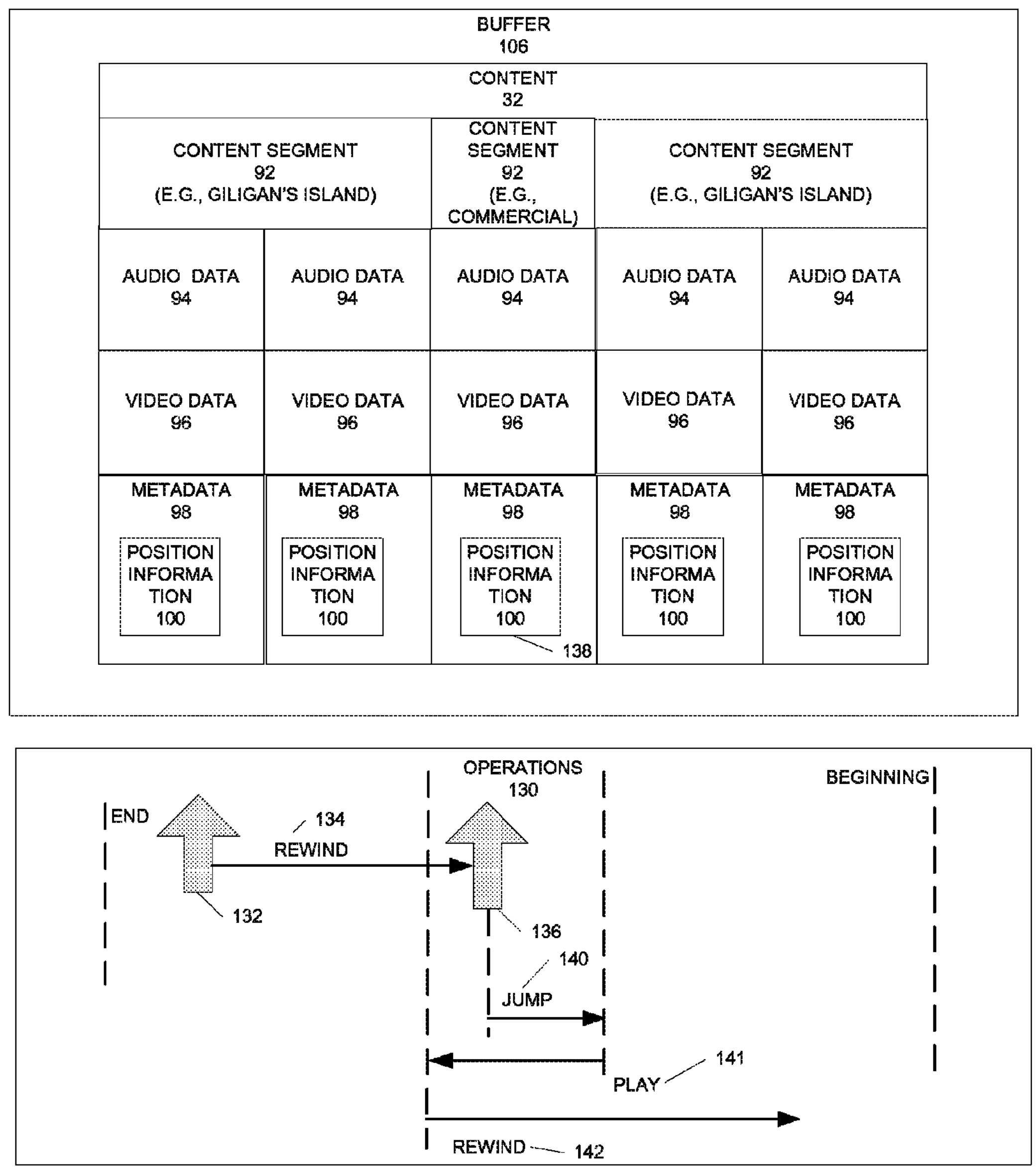
FIG. 6 is a block diagram illustrating a buffer and operations, according to an example embodiment.

FIG. 6 is a block diagram illustrating example embodiments of operations 130 performed in response to a request to position and play. The operations 130 are illustrated below a buffer 106 that stores content segments 92 that are being rendered (e.g., play) to an output device 26 coupled to a receiving device 12. The operations 130 commence with a request 132 from a user to rewind the content 32. For example, the user may be watching an episode of Gilligan's Island and select a rewind button on a remote control 41 that causes rewinding to begin (e.g., callout 134). The rewinding continues past the next content segment 92 of Gilligan's Island and continues into a content segment 92 that includes a commercial. The receiving device 12 responds to entering the content segment for the commercial by causing a speed bump to be displayed on the display device 54. For example, in one embodiment the speed bump may be still image that represents the content of the commercial (e.g., Mercedes Benz Logo). The user may see the speed bump and enter a request 136 to position and play the commercial from the beginning. In response to receiving the request 136, the receiving device 12 may use the corresponding position information 100 (e.g., callout 138) in the metadata 98 to jump (e.g., callout 140) to the beginning of the content segment 92 (e.g., commercial) in the buffer 106. Other embodiments may respond to the request 136 by continuing to rewind to the beginning of the commercial. At operation 141, the commercial is played or rendered to an output device 26 (e.g., play) at a normal speed from the beginning of the commercial. At operation 142, responsive to reaching the end of the commercial, the receiving device 12 may resume rewinding at an accelerated speed. Other embodiments may respond to reaching the end of the commercial by continuing to render at a normal speed in the play mode.

It will be appreciated, that the audio data 94, video data 96, and metadata 98 may not necessarily be stored the same physical buffer 106. For example, in one embodiment the audio data 94, video data 96, and metadata 98 may be stored in respective buffers 106. Nevertheless, the processing, as described above, may remain substantially the same. Further it will be appreciated that the buffer 106 may not be a physical buffer, but rather, a logical buffer 106 that may be implemented in multiple physical storage devices (e.g., memory, disk, DVD, etc.)

Figure 7:
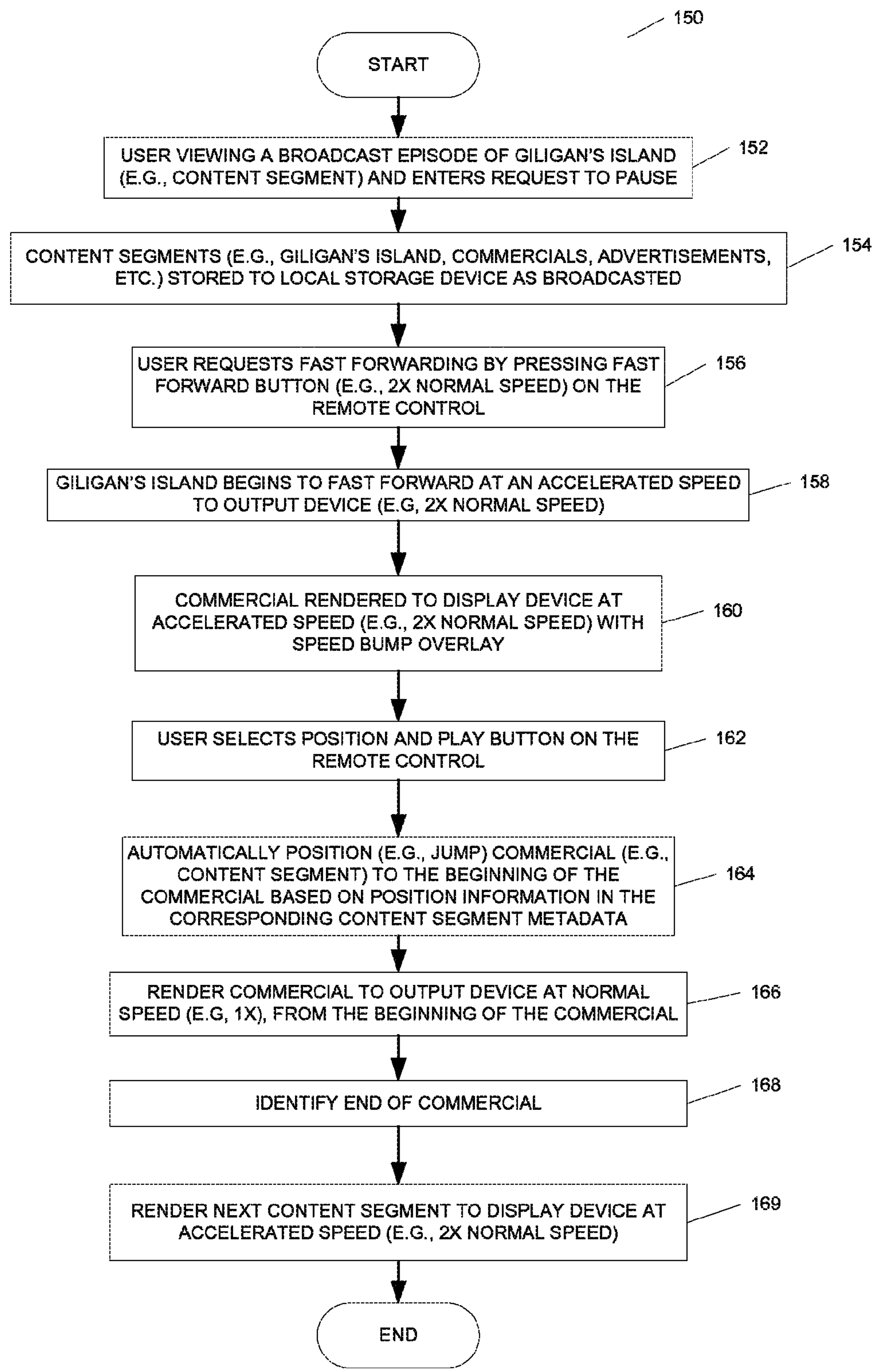
FIG. 7 is a flowchart illustrating a method, according to an example embodiment, to position and play a content segment.

FIG. 7 is a flowchart illustrating a method 150, according to an example embodiment, to position and play a content segment. Illustrated are operations performed at the receiving device 12. The method 150 commences at the receiving device 12, at operation 152, with the user pausing a content segment 92 that is being broadcast over the network 16 in a transmission to the receiving device 12. For example, the user may be viewing an episode of Gilligan's Island and press the stop or pause button on a remote control 41 that, in turn, causes the request module 48 to receive the request to pause.

At operation 154, the communication module 50 responds to the request to pause by causing the receiving device 12 to store content segments 92 to the local storage device 18. For example, the communication module 50 may cause the storage of Gilligan's Island, commercials, advertisements, and any other content segment 92 that may be broadcast while the receiving device 12 is paused.

At operation 156, the request module 48 receives a request from the user to fast forward at two-times normal speed. For example, the request may be entered by the user who selects a button on the remote control 41. The request may include a direction identifier (e.g., forward or reverse) that identifies the forward direction and a speed identifier (e.g., 2×, 4×, 6×, etc.) that identifies two times normal speed. The request module 48 responds to the fast forward request by using the location 108 in the playout information 104 to identify the position information 100 in the content segment 92 that is presently being rendered to the output device 26. If the position information 100 includes a fast forward block 103 that prohibits fast forwarding then the request is ignored. Otherwise the content segment 92 is fast forwarded. In the present example, the episode of Gilligan's Island is not blocked.

At operation 158, the receiving device 12 renders the content segments 92 at an accelerated speed to the output device 26. For example, the render module 74 may render Gilligan's Island at twice-times the normal speed on the display device 54.

At operation 160, the receiving device 12 continues to render the content segments 92 at an accelerated speed. For example, the render module 74 may render a commercial for Friendly Airlines at two-times normal speed on the display device 54 provided that the request module 48 determines that the commercial is not blocked from fast forwarding. In the present example, the commercial is not blocked and is rendered to at twice-times the normal speed on the display device 54. In addition, the receiving device 12 may cause the render module 74 to render a speed bump for Friendly Airlines superimposed over the Friendly Airlines commercial on the display device 54.

At operation 162, the user may see the speed bump and decide to watch the commercial by entering a position and play request that may be received by the request module 48. For example, the user may select a play button on the remote control 41 to enter a position and play request. In another embodiment, the user may select another button on the remote control 41 that may be associated with the position and play function.

At operation 164, the communication module 50 automatically positions the commercial to the beginning of the commercial. For example, the communication module 50 may use the position information 100 in the metadata 98 of the content segment 92 to identify the location of the beginning of the commercial in a buffer 106 and to position to the beginning of the commercial.

At operation 166, the render module 74 may render the commercial at a normal speed to the output device 26 from the beginning of the commercial. For example, the user may view the entire commercial from the beginning at a normal speed for the commercial thereby enabling the user to receive the message communicated by the commercial.

At operation 168, communication module 50 identifies the end of the commercial. At operation 169 the communication module 50 responds to the identification of the end of the commercial by causing the render module 74 to resume fast forwarding. For example, the render module 74 may render the next content segment 92 to the display device at an accelerated speed. In other embodiments, the communication module 50 may cause the render module 74 to continue in play mode. For example, the render module 74 may render the next content segment 92 to the display device at a normal speed for the content segment 92.

Figure 8:
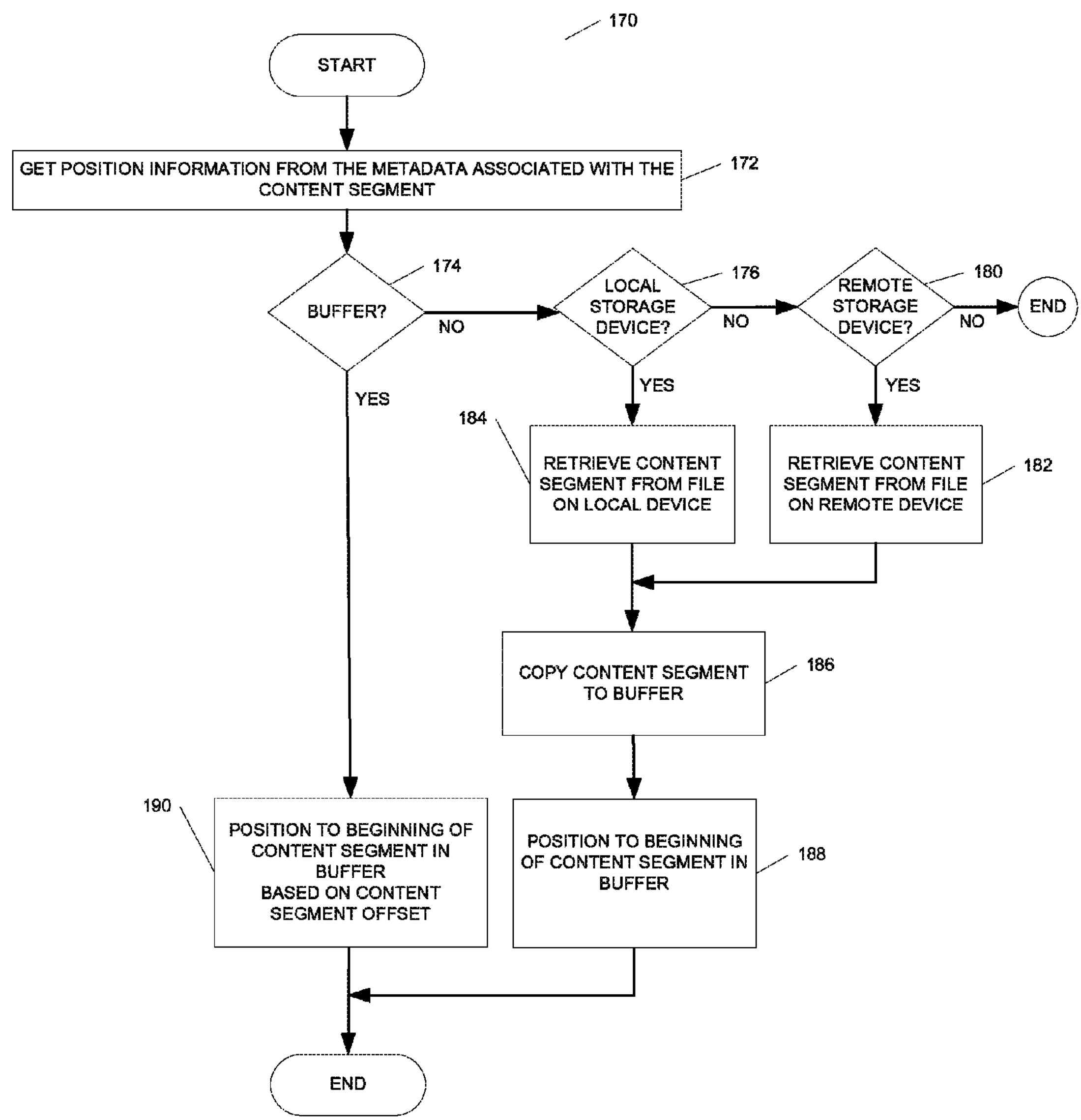
FIG. 8 is a diagram illustrating a method, according to an example embodiment, to automatically position to the beginning of a content segment.

FIG. 8 is a diagram illustrating a method 170, according to an example embodiment, to automatically position to the beginning of a content segment 92. The method 170 commences at operation 172 with the communication module 50 accessing position information 100 associated with the content segment 92 that is currently being rendered to the output device 26. For example, the communication module 50 may utilize the location 108 in the playout information 104 to identify the appropriate position information 100 in the metadata 96 in the buffer 106.

At operation 174, the communication module 50 uses the network address 105 in the position information 100 to determine the location of the beginning of the content segment 92 to be played in response to the request to position and play content. For example, if the network address 105 indicates the content segment 92 is stored in the buffer 106 then a branch is made to operation 190. Otherwise a branch is made to decision operation 176.

At decision operation 176, the communication module 50 uses the network address 105 in the position information 100 to determine if the content segment 92 is in stored on a local storage device 18. For example, if the content segment is stored on the database 22, then a branch is made to operation 184. Otherwise a branch is made to decision operation 180.

At decision operation 180, the communication module 50 uses the network address 105 in the position information 100 to determine if the content segment 92 is in stored on a remote storage device 55. For example, if the content segment is stored on the database 56, then a branch is made to operation 182.

At operation 182, the communication module 50 retrieves the content segment from the database 56. For example, the communication module 50 may use the network address 105 and the content segment offset 107 to retrieve the content segment 92 from a file stored on the database 56.

At operation 184, the communication module 50 retrieves the content segment 92 from the database 22. For example, the communication module 50 may use the network address 105 and the content segment offset 107 to retrieve the content segment 92 from a file stored on the database 22.

At operation 186, the communication module 50 moves the content segment 92 to the buffer 106 and at operation 188 the communication module 50 positions to the beginning of the content segment 92 in the buffer.

At operation 190, the communication module 50 positions to the beginning of the content segment 92 in the buffer based on the content segment offset 107.

Other Example Embodiments—Point to Point Embodiment

In another example embodiment that may be identified as the point to point embodiment, the request module 48 and the communication module 50 may operate at the streaming server 58. The point to point embodiment requires the receiving device 12 to communicate the requests over the network 16 to the streaming server 58 to be processed by the request module 48 that executes at the streaming server 58 and the communication module 50 that executes at the streaming server 58

Other Example Embodiments—Medium and Presentation of Content Segment

Other examples may include the content segment 92 embodied in one or more mediums (e.g., visual, audio, kinetic, etc.), the visual medium presented as motion or still.

Other Example Embodiments—Speed Bumps and Entertainment Content Segments

Other Example Embodiments may include the content segment 92 embodied as entertainment rather than an advertisement or commercial. For example, the speed bump may be used to identify key scenes in a movie and the user may utilize the control buttons 40 or the remote control 41 to select a button that requests a viewing of the key scene from the beginning to the key scene.

Other Examples Embodiments—Local or Remote Storage Device

Further, it will be appreciated by one skilled in the art that the content segment 92 need not be transferred from the buffer 106, as illustrated in the method above. Rather, a second content segment 92 that is different from the fast forwarded advertisement may be rendered at the receiving device 12. For example, the second content segment 92 may be an extended version of the advertisement and may be retrieved from a local storage device 18 (e.g., database 22) or a remote storage device 55 (e.g., database 56) based on a network address (e.g., URL) in the metadata 98. In one embodiment, the second content segment 92 (e.g., extended version) may be retrieved based on a different control button 40 or different button on the remote control 41.

Other Example Embodiments—Content Segment Played at Accelerated Speed

Further, it will be appreciated by a person having ordinary skill in the art that the above described content segment 92 may be designed to be played at normal speed or at any speed within a range of speeds around the normal speed (e.g., accelerated speeds) to achieve a high quality play out.

Figure 9:
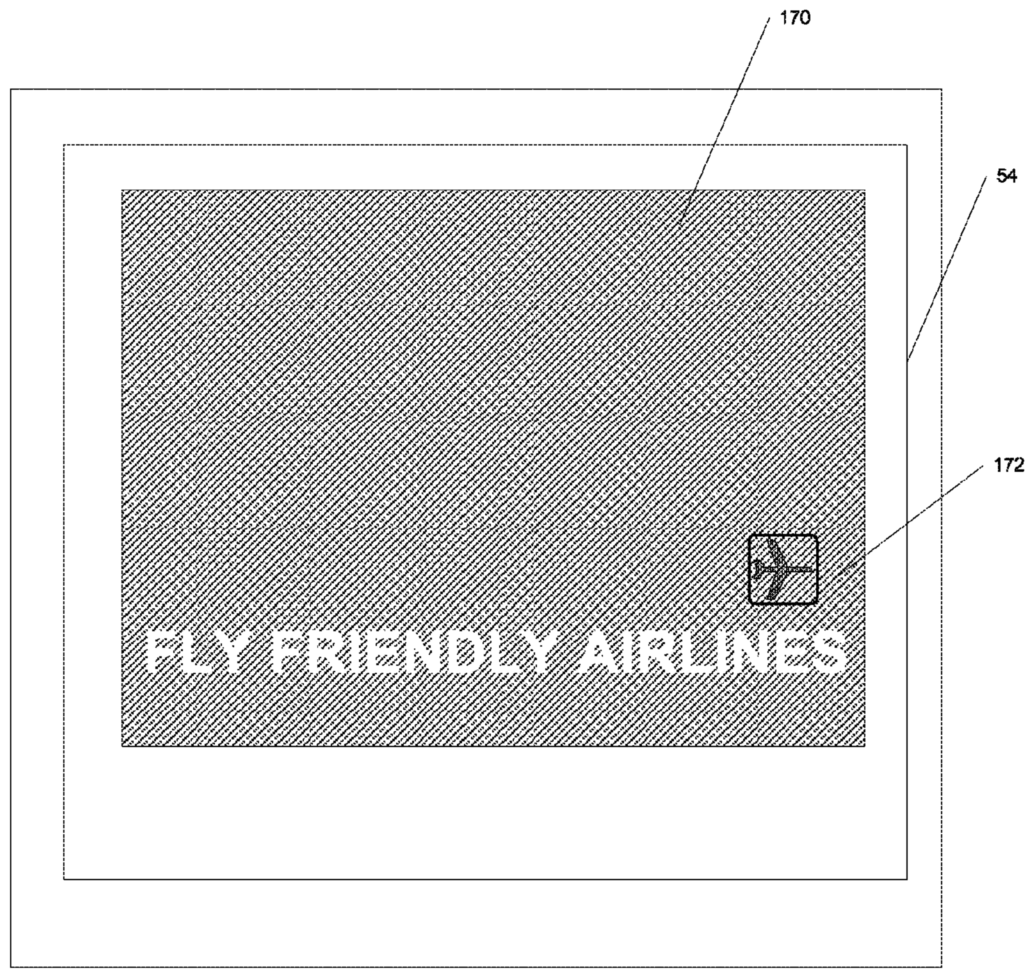
FIG. 9 is a diagram illustrating an image on a display device, according to an example embodiment.

FIG. 9 is an image 170 that is rendered on a display device 54, according to an example embodiment. The image 170 is rendered from a content segment 92 that is an advertisement or commercial for "Friendly Airlines." The content segment 92 is being fast forwarded and is shown to be superimposed with a speed bump 172, "Fly Friendly Airlines." The speed bump 172 may be superimposed over the image on the display device 54 when the content segment 92 is fast forwarding or rewinding.

Figure 10:
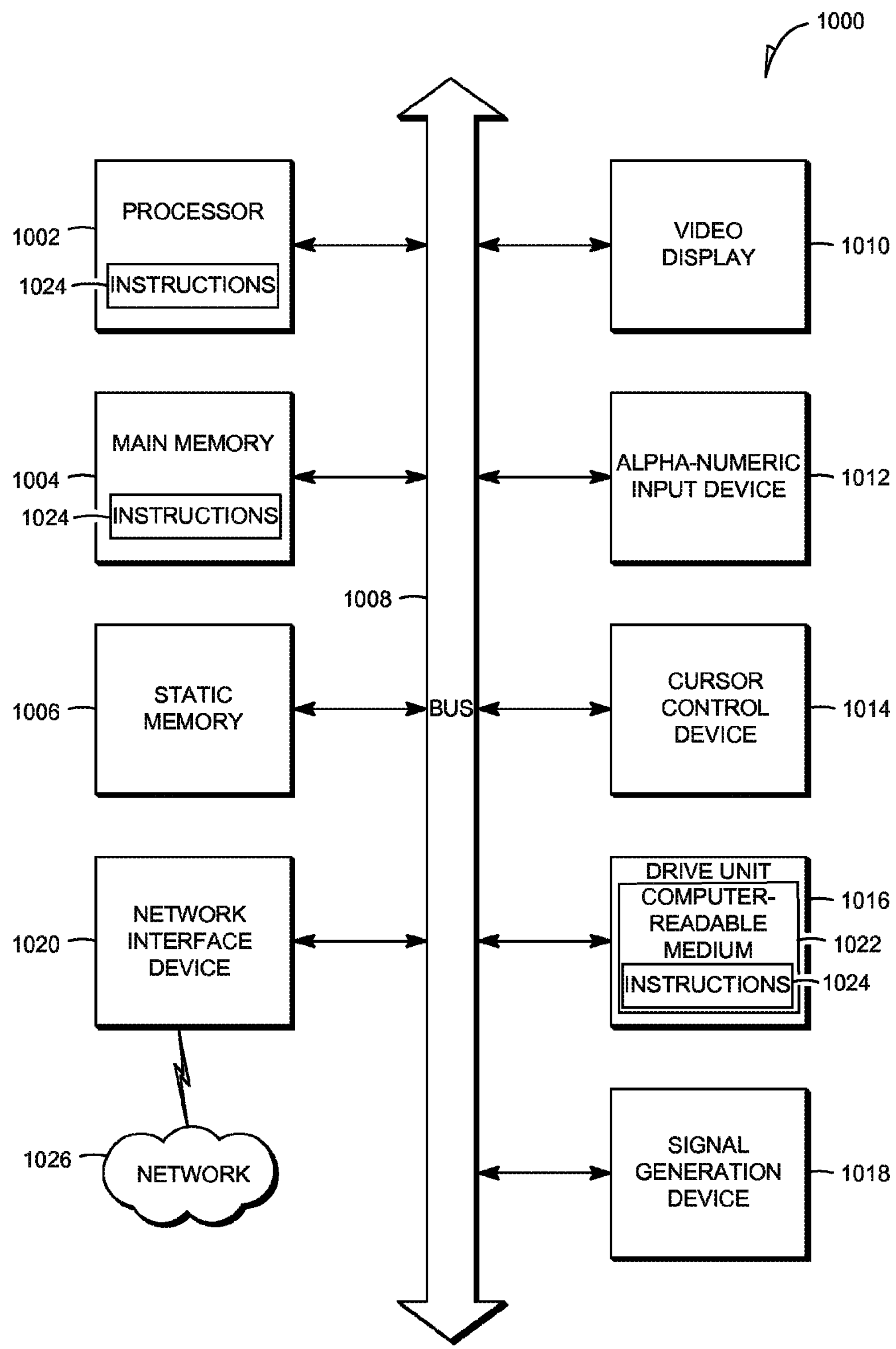
FIG. 10 is a block diagram of a machine, according to an example embodiment, including instructions to perform any one or more of the methodologies described herein.

FIG. 10 shows a diagrammatic representation of a machine in the example form of a computer system 1000 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal PrimaryAssistant (PDA), a cellular telephone, a web appliance, a network router, switch or bridge, an iPod, a personal video recorder (PVR) (e.g., analog or digital input), a personal digital recorder (PDR) (e.g., analog or digital input), a mobile phone, a portable media player, a game console or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signal.

Thus, systems and methods to position and play content have been described. Although the present disclosure has been described with reference to specific example embodiments, it will be evident that various modifications and changes may be made to these example embodiments without departing from the broader spirit and scope of the disclosure. Accordingly, the specification and drawings are to be regarded in an illustrative rather than a restrictive sense.

I claim:

1. A method comprising:

causing a display of media content at an accelerated playback speed distinct from a normal playback speed of the media content, the media content including multiple media segments among which is a media segment that has a reference playback point within the media segment;

interrupting the display of the media content at the accelerated playback speed during accelerated playback of the media segment and at an interruption point that is within the media segment and distinct from the reference playback point, the interrupting being in response to a request that the media segment be played at the normal playback speed;

responsive to the request that the interrupted media segment be played at the normal playback speed, causing a display of the interrupted media segment at the normal playback speed from the reference playback point that is within the interrupted media segment whose accelerated playback was interrupted in response to the request; and resuming the display of the media content at the accelerated playback speed in response to the display of the interrupted media segment at the normal playback speed having ended, the resumed display of the media content displaying a further media segment among the multiple media segments at the accelerated playback speed.

2. The method of claim 1, wherein:

the reference playback point of the media segment within the media content is a beginning of the media segment.

3. The method of claim 1, wherein:

the resuming of the display of the media content at the accelerated playback speed is in response to completion of the requested display of the media segment at the normal speed.

4. The method of claim 1 further comprising:

identifying an end of the media segment during the requested display of the media segment at the normal playback speed; and wherein the resuming of the display of the media content at the accelerated playback speed is in response to detecting that the end of the media segment has been displayed.

5. The method of claim 1, wherein:

the causing of the display of the media segment at the normal playback speed from the reference playback point is based on position metadata that corresponds to the media segment and is included in the media content.

6. The method of claim 1, wherein:

the normal playback speed is applicable to render the media content in a forward direction; and the accelerated playback speed is applicable to render the media content in the forward direction.

7. The method of claim 1, wherein:

the normal playback speed is applicable to render the media content in a forward direction; and the accelerated playback speed is applicable to render the media content in a reverse direction.

8. The method of claim 1, wherein:

the causing of the display of the media content at the accelerated playback speed causes the media segment within the media content to be displayed at the accelerated playback speed.

9. The method of claim 1, wherein:

the causing of the display of the media content at the accelerated playback speed includes causing a still image that represents the media segment to be displayed during the accelerated playback of the media segment, the still image indicating an opportunity to make the request that the media segment be played at the normal playback speed.

10. The method of claim 9, further comprising:

detecting the request that the media segment be played at the normal playback speed, the detecting of the request occurring during display of the still image that indicates the opportunity to make the request.

11. The method of claim 9, wherein:

the causing of the display of the media content at accelerated playback speed causes the still image that indicates the opportunity to make the request to be superimposed over the media segment displayed at the accelerated playback speed.

12. The method of claim 1, wherein:

the media segment is stored in a buffer during the interrupting of the display of the media content during the accelerated playback of the media segment; and the causing of the display of the media segment at the normal playback speed includes moving a present location within the buffer to a buffer address that corresponds to the reference playback point of the media segment.

13. The method of claim 12, wherein:

the moving of the present location within the buffer to the buffer address that corresponds the reference playback point of the media segment causes the media segment to be fast forwarded to the reference playback point and played from the reference playback point.

14. The method of claim 12, wherein:

the moving of the present location within the buffer to the buffer address that corresponds the reference playback point of the media segment causes the media segment to be rewound to the reference playback point and played from the reference playback point.

15. The method of claim 12, wherein:

the moving of the present location within the buffer to the buffer address that corresponds to the reference playback point of the media segment causes the media segment of the played from a beginning of the media segment.

16. The method of claim 1, wherein:

the causing of the display of the media content at accelerated playback speed is performed by a receiving device comprising one or more processors and includes causing an output device to display the media content at the accelerated playback speed;

the interrupting of the display of the media content during playback of the media segment is performed by the receiving device comprising one or more processors and includes causing the output device interrupt the playback of the media segment at the accelerated playback speed;

the causing of the display of the media segment at the normal playback speed is performed by the receiving device comprising one or more processors and includes causing the output device to display the media segment at the normal playback speed; and the resuming of the display of the media content at the accelerated playback speed is performed by the receiving device comprising one or more processors and includes causing the output device to resume the display of the media content at the accelerated playback speed.

17. A non-transitory machine-readable storage medium comprising instructions that, when executed by one or more processors of a machine, cause the machine to perform operations comprising:

causing a display of media content at an accelerated playback speed distinct from a normal playback speed of the media content, the media content including multiple media segments among which is a media segment that has a reference playback point within the media segment;

interrupting the display of the media content at the accelerated playback speed during accelerated playback of the media segment and at an interruption point that is within the media segment and distinct from the reference playback point, the interrupting being in response to a request that the media segment be played at the normal playback speed;

responsive to the request that the interrupted media segment be played at the normal playback speed, causing a display of the interrupted media segment at the normal playback speed from the reference playback point that is within the interrupted media segment whose accelerated playback was interrupted in response to the request; and resuming the display of the media content at the accelerated playback speed in response to the display of the interrupted media segment at the normal playback speed having ended, the resumed display of the media content displaying a further media segment among the multiple media segments at the accelerated playback speed.

18. The non-transitory machine-readable storage medium of claim 17, wherein:

the reference playback point of the media segment within the media content is a beginning of the media segment within the media content.

19. A system comprising:

a render module comprising one or more processors and configured to cause a display of media content at an accelerated playback speed distinct from a normal playback speed of the media content, the media content including multiple media segments among which is a media segment that has a reference playback point within the media segment; and a request module comprising one or more processors and configured to interrupt the display of the media content at the accelerated playback speed during accelerated playback of the media segment and at an interruption point that is within the media segment and distinct from the reference playback point, the interrupting being in response to a request that the media segment be played at the normal playback speed;

the render module being further configured to, responsive to the request that the interrupted media segment be played at the normal playback speed, cause a display of the interrupted media segment at the normal playback speed from the reference playback point that is within the interrupted media segment whose accelerated playback was interrupted in response to the request;

the render module being further configured to resume the display of the media content at the accelerated playback speed in response to the display of the interrupted media segment at the normal playback speed having ended, the resumed display of the media content displaying a further media segment among the multiple media segments at the accelerated playback speed.

20. The system of claim 19, wherein:

the resuming of the display of the media content at the accelerated playback speed is in response to completion of the requested display of the media segment at the normal playback speed.

21. The system of claim 19, wherein:

the reference playback point of the media segment occurs earlier within the media segment than the interruption point.

* * * * *